United States Patent
Bian et al.

(10) Patent No.: US 11,150,407 B2
(45) Date of Patent: Oct. 19, 2021

(54) OPTICAL COUPLERS WITH NON-LINEAR TAPERING

(71) Applicants: GLOBALFOUNDRIES U.S. Inc., Santa Clara, CA (US); KHALIFA UNIVERSITY OF SCIENCE AND TECHNOLOGY, Abu Dhabi (AE)

(72) Inventors: Yusheng Bian, Ballston Lake, NY (US); Ajey Poovannummoottil Jacob, Watervliet, NY (US); Sujith Chandran, Abu Dhabi (AE)

(73) Assignees: GLOBALFOUNDRIES U.S. INC., Santa Clara, CA (US); KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 0 days.

(21) Appl. No.: 16/821,299

(22) Filed: Mar. 17, 2020

(65) Prior Publication Data
US 2021/0294035 A1    Sep. 23, 2021

(51) Int. Cl.
| G02B 6/122 | (2006.01) |
| G02B 6/124 | (2006.01) |
| G02B 6/30  | (2006.01) |
| G02B 6/125 | (2006.01) |
| G02B 6/34  | (2006.01) |
| G02B 6/26  | (2006.01) |

(52) U.S. Cl.
CPC .......... *G02B 6/1228* (2013.01); *G02B 6/124* (2013.01); *G02B 6/125* (2013.01); *G02B 6/26* (2013.01); *G02B 6/305* (2013.01); *G02B 6/34* (2013.01)

(58) Field of Classification Search
CPC .. G02B 6/12004; G02B 6/1228; G02B 6/125; G02B 6/26; G02B 6/2813; G02B 6/29344; G02B 6/305; G02B 6/124; G02B 6/34

USPC ... 385/14, 32, 42–43, 129, 130, 132, 37, 47, 385/50
See application file for complete search history.

(56) References Cited

U.S. PATENT DOCUMENTS 10,031,291 B1 *   7/2018   Horth .................. G02B 6/2813

FOREIGN PATENT DOCUMENTS

| WO | 2016077499 A2 | 5/2016 |
| WO | 2018185576 A2 | 10/2018 |

OTHER PUBLICATIONS

K. Solehmainen, M. Kapulainen, M. Harjanne and T. Aalto, "Adiabatic and Multimode Interference Couplers on Silicon-on-Insulator," in IEEE Photonics Technology Letters, vol. 18, No. 21, pp. 2287-2289, Nov. 1, 2006.

Jiejiang Xing, Kang Xiong, Hao Xu, Zhiyong Li, Xi Xiao, Jinzhong Yu, and Yude Yu, "Silicon-on-insulator-based adiabatic splitter with simultaneous tapering of velocity and coupling," Opt. Lett. 38, 2221-2223 (2013).

(Continued)

*Primary Examiner* — Michael P Mooney
(74) *Attorney, Agent, or Firm* — Thompson Hine LLP; Anthony Canale (57) ABSTRACT

Structures for an optical coupler and methods of fabricating a structure for an optical coupler. A first waveguide core has a first tapered section and a second waveguide core has a second tapered section positioned adjacent to the first tapered section. The first tapered section has a first shape determined by a first non-linear function, and the second tapered section has a second shape determined by a second non-linear function.

20 Claims, 4 Drawing Sheets

(56) References Cited

OTHER PUBLICATIONS

Han Yun, Yun Wang, Fan Zhang, Zeqin Lu, Stephen Lin, Lukas Chrostowski, and Nicolas A. F. Jaeger, "Broadband 2 x 2 adiabatic 3 dB coupler using silicon-on-insulator sub-wavelength grating waveguides," Opt. Lett. 41, 3041-3044 (2016).
M. A. Tran, C. Zhang and J. E. Bowers, "A broadband optical switch based on adiabatic couplers," 2016 IEEE Photonics Conference (IPC), Waikoloa, HI, 2016, pp. 755-756.
L. Xu et al., "Polarization independent adiabatic 3-dB coupler for silicon-on-insulator," 2017 Conference on Lasers and Electro-Optics (CLEO), San Jose, CA, 2017, pp. 1-2.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019.
Yun et al., "2x2 adiabatic 3-dB coupler on silicon-on-insulator rib waveguides", Proc. SPIE 8915, Photonics North 2013, 89150V (Oct. 11, 2013).
L. Cao, A. Elshaari, A. Aboketaf, and S. Preble, "Adiabatic couplers in SOI waveguides," in Conference on Lasers and Electro-Optics 2010, OSA Technical Digest (CD) (Optical Society of America, 2010), paper CThAA2.
Mu, X.; Wu, S.; Cheng, L.; Fu, H., "Edge Couplers in Silicon Photonic Integrated Circuits: A Review", Published Feb. 24, 2020, Appl. Sci. 10, 1538.

\* cited by examiner

FIG. 6

OPTICAL COUPLERS WITH NON-LINEAR TAPERING

BACKGROUND

The present invention relates to photonics chips and, more specifically, to structures for an optical coupler and methods of fabricating a structure for an optical coupler.

Photonics chips are used in many applications and systems such as data communication systems and data computation systems. A photonics chip integrates optical components, such as waveguides, optical switches, and optical couplers, and electronic components, such as field-effect transistors, into a unified platform. Among other factors, layout area, cost, and operational overhead may be reduced by the integration of both types of components.

Optical couplers are optical components that are commonly used in photonics chips to couple light between waveguides with desired coupling ratios. Adiabatic 3-dB optical couplers are 2×2 couplers that may be used in a photonics chip for coupling/splitting light evenly. Conventional adiabatic 3-dB optical couplers may have a large footprint, may be wavelength dependent, and may be sensitive to fabrication errors. Conventional adiabatic 3-dB optical couplers may also exhibit a high insertion loss.

Improved structures for an optical coupler and methods of fabricating a structure for an optical coupler are needed.

SUMMARY

In an embodiment of the invention, a structure for an optical coupler is provided. The structure includes a first waveguide core having a first tapered section and a second waveguide core having a second tapered section positioned adjacent to the first tapered section. The first tapered section has a first shape determined by a first non-linear function, and the second tapered section has a second shape determined by a second non-linear function.

In an embodiment of the invention, a method of forming a structure for an optical coupler is provided. The method includes forming a first waveguide core having a first tapered section and forming a second waveguide core having a second tapered section positioned adjacent to the first tapered section. The first tapered section has a first shape determined by a first non-linear function, and the second tapered section has a second shape determined by a second non-linear function.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
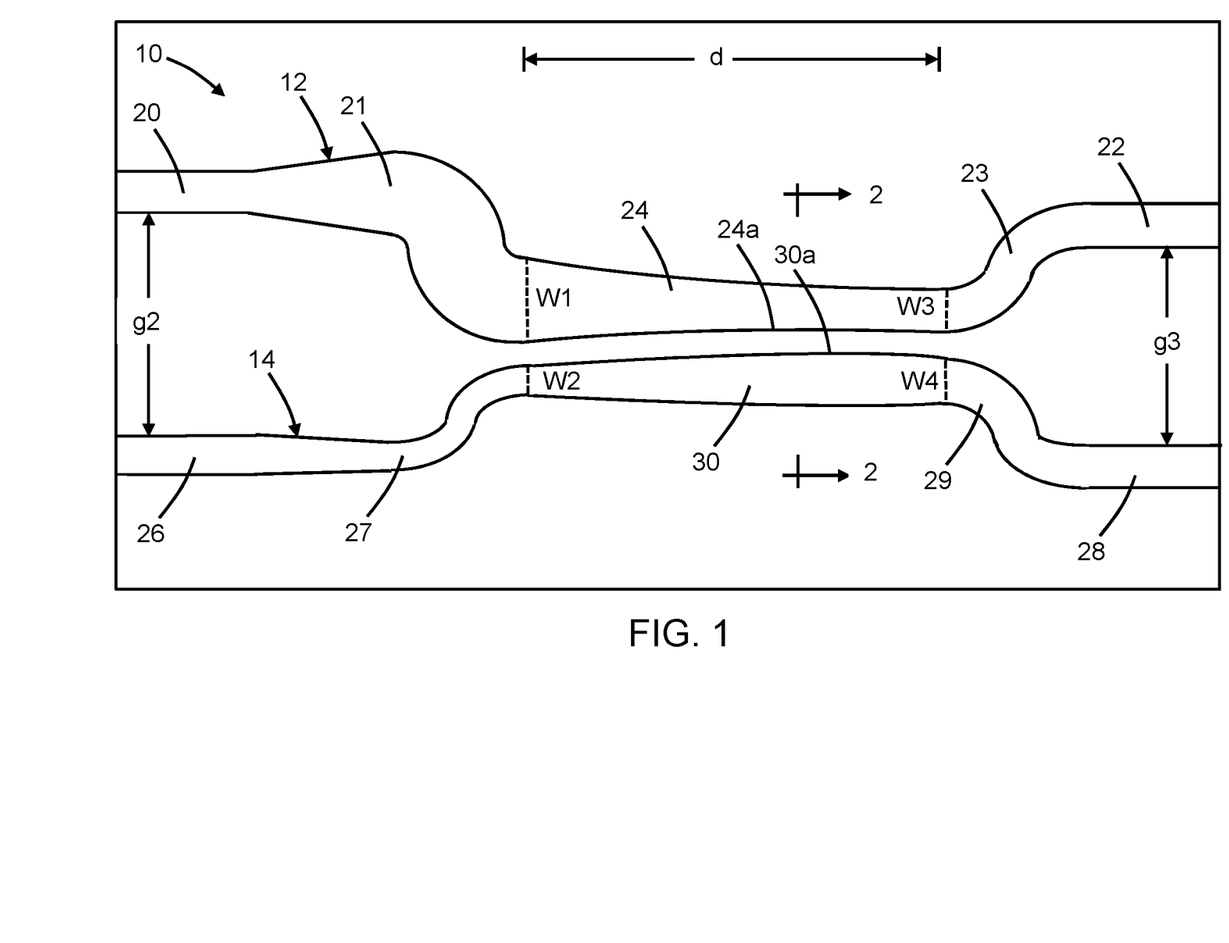
FIG. 1 is a top view of a structure at an initial fabrication stage of a processing method in accordance with embodiments of the invention.
Figure 2:
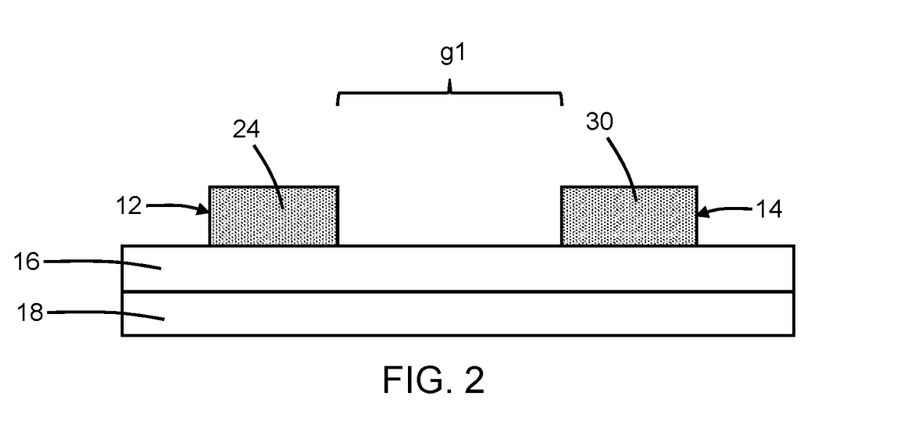
FIG. 2 is a cross-sectional view taken generally along line 2-2 in FIG. 1.

With reference to FIGS. 1, 2 and in accordance with embodiments of the invention, a structure 10 for an optical coupler, such as an adiabatic 3-dB optical coupler, includes a waveguide core 12 and a waveguide core 14 that are positioned over a dielectric layer 16. The waveguide cores 12, 14 may be composed of materials having the same composition. In an embodiment, the waveguide cores 12, 14 may be composed of a single-crystal semiconductor material, such as single-crystal silicon. The single-crystal semiconductor material may be a device layer of a silicon-on-insulator (SOI) wafer that further includes a buried insulator layer composed of a dielectric material, such as silicon dioxide, that provides the dielectric layer 16 and a substrate 18 composed of a single-crystal semiconductor material, such as single-crystal silicon, under the buried insulator layer. The waveguide cores 12, 14 may be concurrently patterned from the device layer of the silicon-on-insulator wafer by lithography and etching processes during front-end-of-line processing. The device layer of the silicon-on-insulator wafer may be fully etched to define the waveguide cores 12, 14 as ridge waveguides as shown or, alternatively, the device layer may only be partially etched to define a rib waveguide including a slab on the dielectric layer 16.

The waveguide core 12 includes an input section 20, a routing section 21, an output section 22, a routing section 23, and a tapered section 24. The tapered section 24 is connected to the input section 20 by the routing section 21, and the tapered section 24 is connected to the output section 22 by the routing section 23. The routing section 21 of the waveguide core 12 may include a taper that widens the waveguide core 12 and bends that displace the tapered section 24 of the waveguide core 12 laterally relative to the input section 20. The routing section 23 of the waveguide core 12 may include bends that displace the output section 22 of the waveguide core 12 laterally relative to the tapered section 24.

The waveguide core 14 includes an input section 26, a routing section 27, an output section 28, a routing section 29, and a tapered section 30. The tapered section 30 is connected by the routing section 27 to the input section 26, and the tapered section 30 is connected by the routing section 29 to the output section 28. The routing section 27 of the waveguide core 12 may include a taper that narrows the waveguide core 14 and bends that displace the tapered section 30 of the waveguide core 14 laterally relative to the input section 26. The routing section 29 of the waveguide core 14 may include bends that displace the output section 28 of the waveguide core 14 laterally relative to the tapered section 30. The tapered section 30 includes a sidewall 30a that is positioned adjacent to a sidewall 24a of the tapered section 24.

The routing section 21 of the waveguide core 12 and the routing section 27 of the waveguide core 14 cooperate to reroute the physical paths of the waveguide cores 12, 14 such that the tapered section 24 of the waveguide core 12 is positioned in close proximity to the tapered section 30 of the waveguide core 14. In an embodiment, the tapered section 24 of the waveguide core 12 is positioned adjacent to the tapered section 30 of the waveguide core 14 over a given distance, d, and the adjacent sidewalls 24a, 30a of the tapered sections 24, 30 may be separated by a gap, g1, over the distance, d. In an embodiment, the gap, g1, may be constant over the distance, d. The input sections 20, 26 and the output sections 22, 28 may be straight (i.e., non-bent) sections. The input sections 20, 26 may be separated by a gap, g2, that is greater than the gap, g1. The output sections 22, 28 may be separated by a gap, g3, that is also greater than the gap, g1.

All sections 20, 21, 22, 23, 24 of the waveguide core 12 may be coplanar at their top and bottom surfaces to provide a uniform thickness. In an alternative embodiment, one or more of the sections 20, 21, 22, 23, 24 of the waveguide core 12 may have a different thickness. All sections 26, 27, 28, 29, 30 of the waveguide core 14 may be coplanar at the top and bottom surfaces to provide a uniform thickness. In an alternative embodiment, one or more of the sections 26, 27, 28, 29, 30 of the waveguide core 14 may have a different thickness.

The input section 20 of the waveguide core 12 and the input section 26 of the waveguide core 14 may be spatially separated by a distance (e.g., gap, g2, equal to two microns) adequate to ensure that no coupling occurs. Similarly, the output section 22 of the waveguide core 12 and the output section 28 of the waveguide core 14 may be spatially separated by a distance (e.g., gap, g3, equal to two microns) adequate to ensure that no coupling occurs. The tapered section 30 of the waveguide core 14 is arranged adjacent to the tapered section 24 of the waveguide core 12, and the tapered sections 24, 30 are spaced closely enough by the gap, g1, to permit light exchange with each other by directional coupling as further described below. For example, the tapered sections 24, 30 may be spatially separated by a distance of less than 0.5 microns to ensure the occurrence of directional coupling between the waveguide cores 12, 14.

The waveguide core 12 has a width, W1, at the intersection between the routing section 21 and the tapered section 24 defining an input port to the tapered section 24. The waveguide core 14 has a width, W2, at the intersection between the routing section 27 and the tapered section 30 defining an input port to the tapered section 30. The widths W1, W2 may differ with the width, W1, being greater than the width, W2. In an embodiment, the width W1 may be equal to the sum of a given width (w) and a width difference (Δw) (i.e., W1=w+Δw), and the width W2 may be equal to the difference between the given width (w) and the width difference (Δw) (i.e., W2=w−Δw). The waveguide core 12 has a width, W3, at the intersection between the routing section 23 and the tapered section 24 defining an output port from the tapered section 24. The waveguide core 14 has a width, W4, at the intersection between the routing section 29 and the tapered section 30 defining an output port from the tapered section 30. In an embodiment, the widths W3, W4 may be equal. The input ports and the output ports are indicated by the dashed lines in FIG. 1.

The tapered section 24 tapers with a decreasing width in a direction from the input port to the output port. The tapered section 24 is tapered with a varying width that is described by a non-linear function. In an embodiment, the non-linear function may be a sinusoidal function. In an embodiment, the non-linear function may be an exponential function that specifies the width $W_1(x)$ of the tapered section 24 as a function of position L(x) along the length, $L_0$, of the tapered section 24. The exponential function may be expressed in equation form by:

$$W_1(x) = (W + dW) \times \exp\left(a\left(\frac{L(x)}{L_0}\right)^{Xfactor}\right)$$

where $$a = \log\left(\frac{W}{W + dW}\right),$$

the length, $L_0$, is equal to the distance, d, over which the tapered sections 24, 30 are adjacent, and the Xfactor is a number less than one.

The tapered section 30 tapers with an increasing width in a direction from the input port to the output port. The tapered section 30 is tapered with a varying width that is described by a non-linear function. In an embodiment, the non-linear function may be a sinusoidal function. In an embodiment, the non-linear function may be an exponential function that specifies the width $W_2(x)$ of the tapered section 30 as a function of position L(x) along the length, $L_0$, of the tapered section 30. The exponential function may be expressed in equation form by:

$$W_2(x) = (W - dW) \times \exp\left(b\left(\frac{L(x)}{L_0}\right)^{Xfactor}\right)$$

where $$b = \log\left(\frac{W}{W - dW}\right),$$

the length, $L_0$, is equal to the distance, d, over which the tapered sections 24, 30 are adjacent, and the Xfactor is a number less than one. The Xfactor may be equal for the equations describing the different tapered sections 24, 30.

The non-linear function specifying the varying width of the tapered section 24 determines the shape of the tapered section 24 and, in particular, the non-linear function determines the curvature of the sidewall 24a of the tapered section 24 to establish the sidewall shape. The non-linear function specifying the varying width of the tapered section 30 determines the shape of the tapered section 30 and, in particular, the non-linear function determines the curvature of the sidewall 30a of the tapered section 30 to establish the sidewall shape. The non-linear functions may be complementary such that the adjacent sidewalls 24a, 30a of the tapered sections 24, 30 are spaced by a gap, g1, that is constant over the distance, d.

Figure 3:
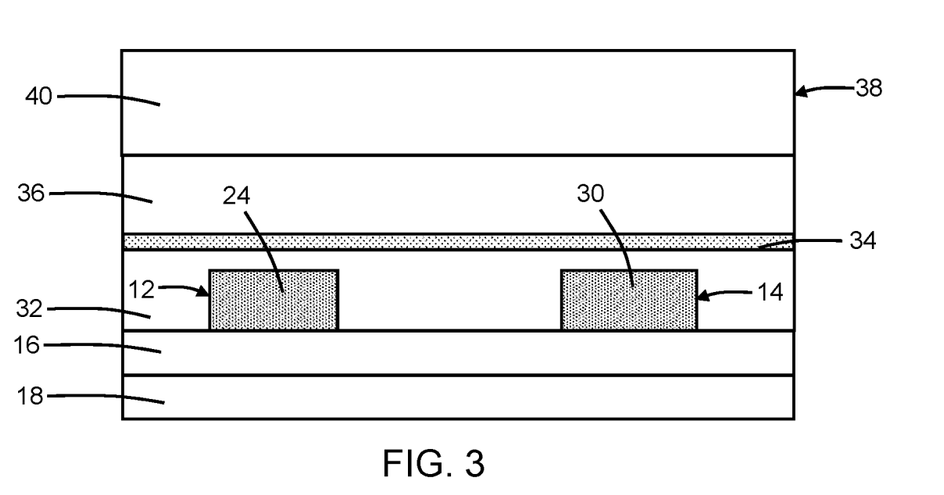
FIG. 3 is a cross-sectional of the structure at a fabrication stage subsequent to FIG. 2.

With reference to FIG. 3 in which like reference numerals refer to like features in FIG. 2 and at a subsequent fabrication stage, dielectric layers 32, 34, 36 are formed over the waveguide cores 12, 14. The dielectric layers 32, 36 may be composed of a dielectric material, such as silicon dioxide, deposited by atomic layer deposition or chemical vapor deposition. The dielectric layer 32 may be planarized after deposition with, for example, chemical mechanical polishing to remove topography. The dielectric layer 34, which is optional, may be composed of dielectric material, such as silicon nitride, deposited by chemical vapor deposition or atomic layer deposition over the dielectric layer 32, and the dielectric layer 36 is deposited over the dielectric layer 34.

A back-end-of-line stack 38 is formed over the dielectric layer 36. The back-end-of-line stack 38 may include one or more interlayer dielectric layers 40 composed of one or more dielectric materials, such as a carbon-doped silicon oxide, and metallization (e.g., contacts and wiring) composed of, for example, copper, tungsten, and/or cobalt that is arranged in the one or more interlayer dielectric layers 40.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

Optical signals propagating as light with a mode component (e.g., the fundamental transverse electric (TE) mode) may be guided on the photonics chip by the waveguide core 12 to the structure 10. Optical signals propagating as light with a different mode component (e.g., the first-order transverse electric (TE) mode) may be guided on the photonics chip by the waveguide core 14 to the structure 10. In the tapered sections 24, 30, a portion of the light may be transferred from the tapered section 24 of the waveguide core 12 to the tapered section 30 of the waveguide core 14 and a portion of the light may be transferred from the tapered section 30 of the waveguide core 14 to the tapered section 24 of the waveguide core 12. In each instance, the portion may be one-half for even (i.e., 50%-50%) splitting or approximately even splitting of the light. Light of both mode components will exit the structure 10 through the output section 22 of the waveguide core 12 and also through the output section 28 of the waveguide core 14 to be further guided on the photonics chip to respective downstream destinations.

The structure 10 may provide a mechanism to couple light between the waveguides associated with the waveguide cores 12, 14. The light may be coupled with a desired coupling ratio, such as a 50%-50% coupling ratio that provides an even split of the light. The structure 10 may be wavelength independent and less sensitive to fabrication variations in comparison with other types of optical couplers. The structure 10 may also provide a size reduction that increases the available layout area on the photonics chip for the placement of other components.

Figure 4:
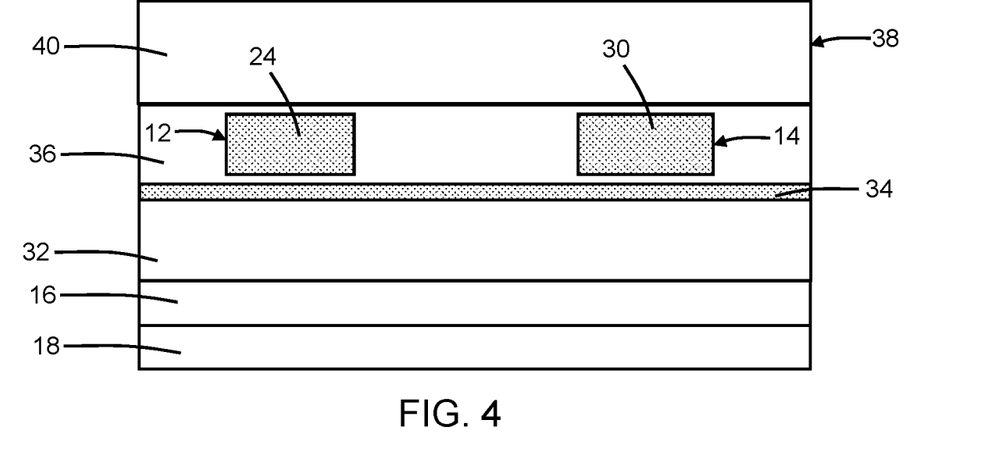
FIGS. 4 and 5 are cross-sectional views of structures in accordance with alternative embodiments of the invention.

With reference to FIG. 4 in which like reference numerals refer to like features in FIG. 3 and in accordance with alternative embodiments of the invention, the waveguide cores 12, 14 may be composed of a different material, such as silicon nitride, and may be displaced further above the dielectric layer 16. The waveguide cores 12, 14 may be concurrently patterned from a deposited layer of the different material by lithography and etching processes during middle-of-line or back-end-of-line processing of the photonics chip. The deposited layer may be fully etched to define the waveguide cores 12, 14 as ridge waveguides as shown or, alternatively, may only be partially etched to define a rib waveguide with a slab on the dielectric layer 16.

Figure 5:
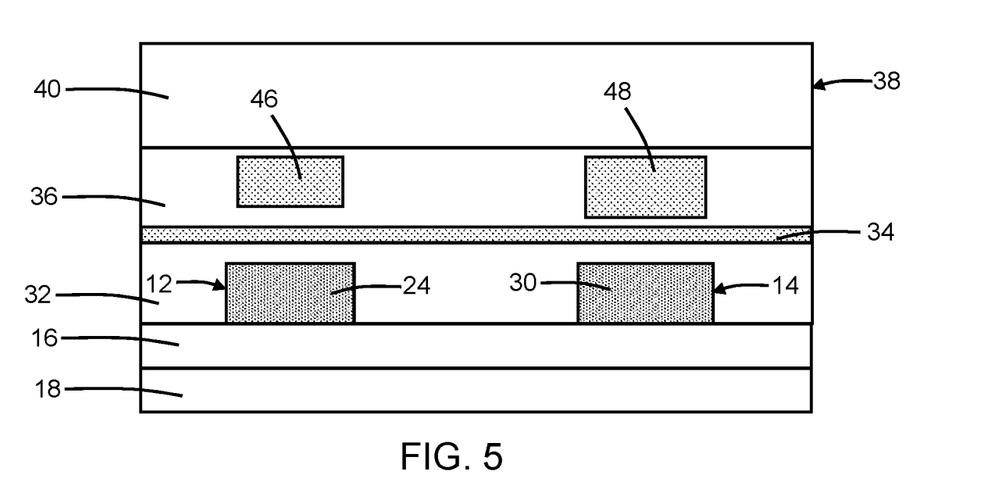

With reference to FIG. 5 in which like reference numerals refer to like features in FIG. 3 and in accordance with alternative embodiments of the invention, a waveguide core 46 may be positioned over the waveguide core 12, and a waveguide core 48 may be positioned over the waveguide core 14. The waveguide core 46 may have the same shape as the waveguide core 12 and, in particular, the section of the waveguide core 46 over the tapered section 24 of the waveguide core 12 may have a shape determined by the same non-linear function as the tapered section 24 but with a narrower width. The waveguide core 46 may extend between truncated ends respectively located over the input section 20 and the output section 22 of the waveguide core 12. The waveguide core 48 may have the same shape as the waveguide core 14 and, in particular, the section of the waveguide core 48 over the tapered section 30 of the waveguide core 14 may have a shape determined by the same non-linear function as the tapered section 30 but with a narrower width. The waveguide core 48 may extend between truncated ends respectively located over the input section 26 and the output section 28 of the waveguide core 14. In an embodiment, the waveguide cores 46, 48 may be composed of a dielectric material, such as silicon nitride. In an alternative embodiment, the waveguide cores 46, 48 may be composed of single-crystal semiconductor material and may be arranged beneath the waveguide cores 12, 14, of FIG. 4. The added waveguide cores 46, 48 may improve the efficiency of the light coupling.

Figure 6:
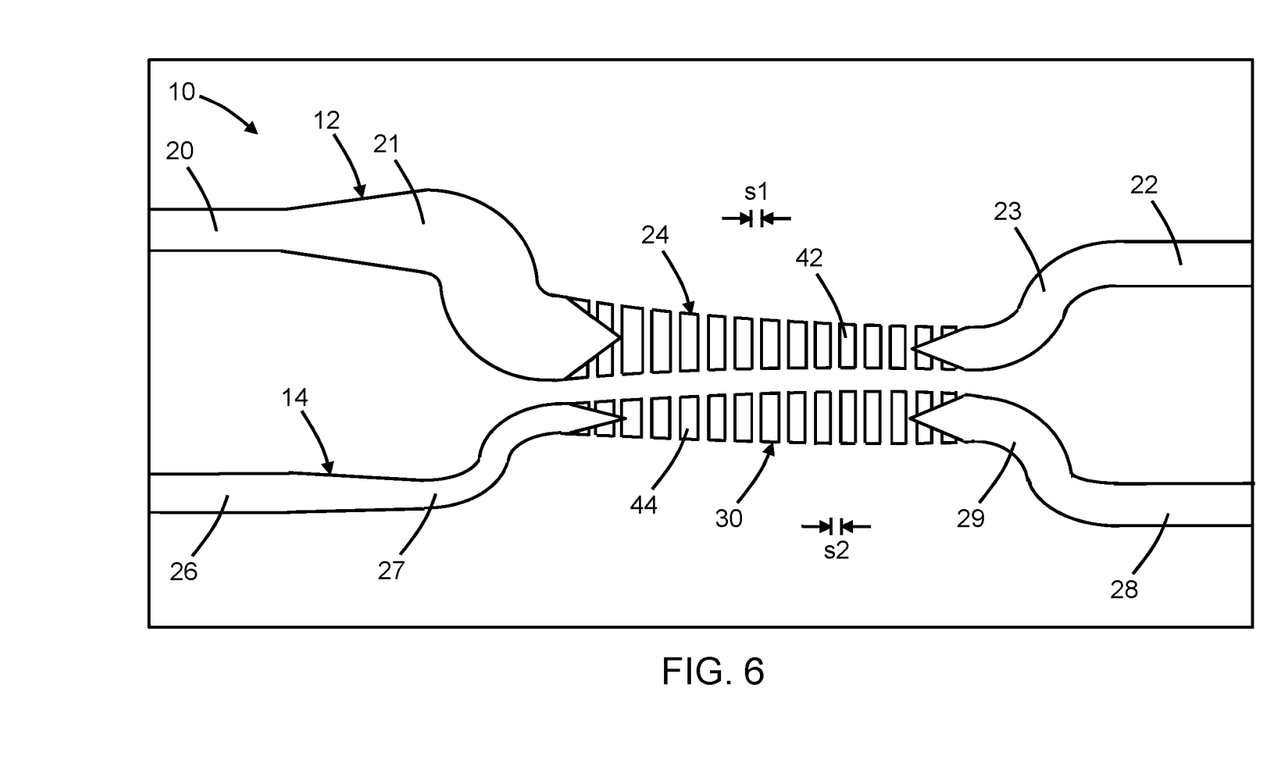
FIG. 6 is a top view of a structure in accordance with alternative embodiments of the invention.

With reference to FIG. 6 in which like reference numerals refer to like features in FIG. 1 and in accordance with alternative embodiments of the invention, the tapered section 24 of the waveguide core 12 may be broken into portions to define subwavelength grating features 42 that are separated by spaces, s1, and the tapered section 30 of the waveguide core 14 may be broken into portions to define subwavelength grating features 44 that are separated by spaces, s2. Portions of the dielectric material of the dielectric layer 32 fill the spaces, s1, between the grating features 42 and the spaces, s2, between the grating features 44. The subwavelength grating features 42 are contained within an envelope with a tapering described by the non-linear function of the tapered section 24. Similarly, the subwavelength grating features 44 are contained within an envelope with a tapering described by the non-linear function of the tapered section 30. Dividing the tapered sections 24, 30 into grating features 42, 44 reduces the effective refractive index. The grating features 42, 44 may also be provided in the embodiment of the structure of FIG. 4.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical coupler, the structure comprising:
    a first waveguide core having a first input section, a first tapered section, a first input routing section connecting the first input section to the first tapered section, a first output section, and a first output routing section connecting the first output section to the first tapered section, the first input routing section including a first taper that widens the first waveguide core relative to the first input section and a first plurality of bends that laterally displace the first tapered section relative to the first input section, the first output routing section including a second plurality of bends that laterally displace the first output section relative to the first tapered section, and the first tapered section having a first shape determined by a first non-linear function; and
    a second waveguide core having a second input section, a second tapered section positioned adjacent to the first tapered section, a second input routing section connecting the second input section to the second tapered section, a second output section, and a second output routing section connecting the second output section to the second tapered section, the second input routing section including a second taper that narrows the second waveguide core relative to the second input section and a third plurality of bends that laterally displace the second tapered section relative to the second input section, the second output routing section including a fourth plurality of bends that laterally displace the second output section relative to the second tapered section, and the second tapered section having a second shape determined by a second non-linear function.

2. The structure of claim 1 wherein the first tapered section and the second tapered section are adjacently positioned over a distance, the first tapered section and the second tapered section are separated by a first gap over the distance, and the first non-linear function is complementary to the second non-linear function such that the first gap is uniform over the distance.

3. The structure of claim 2 wherein the first non-linear function is a first exponential function, and the second non-linear function is a second exponential function.

4. The structure of claim 3 wherein the first tapered section has a first input port with a first width, the second tapered section has a second input port with a second width, and the first width is greater than the second width.

5. The structure of claim 3 wherein the first tapered section has a first output port with a first width, the second tapered section has a second output port with a second width, and the first width is substantially equal to the second width.

6. The structure of claim 2 wherein, the first input section is separated from the second input section by a second gap, and the second gap is greater than the first gap.

7. The structure of claim 2 wherein the first output section is separated from the second output section by a second gap, and the second gap is greater than the first gap.

8. The structure of claim 1 wherein the first tapered section includes a first plurality of grating features and a first plurality of spaces between the first plurality of grating features, and the second tapered section includes a second plurality of grating features and a second plurality of spaces between the second plurality of grating features.

9. The structure of claim 1 further comprising:
    a third waveguide core arranged over or under the first waveguide core, the third waveguide core comprised of a different material than the first waveguide core.

10. The structure of claim 1 wherein the first non-linear function is a first exponential function, and the second non-linear function is a second exponential function.

11. The structure of claim 1 wherein the first tapered section has a first input port with a first width, the second tapered section has a second input port with a second width, and the first width is greater than the second width.

12. The structure of claim 1 wherein the first tapered section has a first output port with a first width, the second tapered section has a second output port with a second width, and the first width is substantially equal to the second width.

13. The structure of claim 1 wherein the first tapered section and the second tapered section are adjacently positioned over a distance, the first tapered section and the second tapered section are separated by a first gap over the distance, the first input section is separated from the second input section by a second gap, and the second gap is greater than the first gap.

14. The structure of claim 1 wherein the first tapered section and the second tapered section are adjacently positioned over a distance, the first tapered section and the second tapered section are separated by a first gap over the distance, the first output section is separated from the second output section by a second gap, and the second gap is greater than the first gap.

15. The structure of claim 1 wherein the first waveguide core is comprised of a first material, and the second waveguide core is comprised of second material having the same composition as the first material.

16. A method of forming a structure for an optical coupler, the method comprising:
    forming a first waveguide core having a first input section, a first tapered section, a first input routing section connecting the first input section to the first tapered section, a first output section, and a first output routing section connecting the first output section to the first tapered section, the first input routing section including a first taper that widens the first waveguide core relative to the first input section and a first plurality of bends that laterally displace the first tapered section relative to the first input section, and the first output routing section including a second plurality of bends that laterally displace the first output section relative to the first tapered section; and forming a second waveguide core having a second input section, a second tapered section positioned adjacent to the first tapered section, a second input routing section connecting the second input section to the second tapered section, a second output section, and a second output routing section connecting the second output section to the second tapered section, the second input routing section including a second taper that narrows the second waveguide core relative to the second input section and a third plurality of bends that laterally displace the second tapered section relative to the second input section, and the second output routing section including a fourth plurality of bends that laterally displace the second output section relative to the second tapered section, wherein the first tapered section has a first shape determined by a first non-linear function, and the second tapered section has a second shape determined by a second non-linear function.

17. The method of claim 16 wherein the first tapered section and the second tapered section are adjacently positioned over a distance, the first tapered section and the second tapered section are separated by a first gap over the distance, and the first non-linear function is complementary to the second non-linear function such that the first gap is uniform over the distance.

18. The method of claim 16 wherein the first non-linear function is a first exponential function, and the second non-linear function is a second exponential function.

19. The method of claim 16 wherein the first tapered section has a first input port with a first width, the second tapered section has a second input port with a second width, and the first width is greater than the second width.

20. The method of claim 16 wherein the first tapered section and the second tapered section are adjacently positioned over a distance, the first tapered section and the second tapered are separated by a first gap over the distance, the first input section is separated from the second input section by a second gap, and the second gap is greater than the first gap.

* * * * *